(12) United States Patent
Quayle et al.

(10) Patent No.: US 9,533,770 B2
(45) Date of Patent: Jan. 3, 2017

(54) AIRCRAFT BONDING NETWORK

(75) Inventors: Alan Quayle, Bristol (GB); James Wilson, Winscombe (GB); Jon McAlinden, Bristol (GB); Paul Hadley, Weston-Super-Mare (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 191 days.

(21) Appl. No.: 14/005,129

(22) PCT Filed: Mar. 9, 2012

(86) PCT No.: PCT/GB2012/050534
§ 371 (c)(1),
(2), (4) Date: Sep. 13, 2013

(87) PCT Pub. No.: WO2012/123725
PCT Pub. Date: Sep. 20, 2012

(65) Prior Publication Data
US 2014/0002947 A1   Jan. 2, 2014

(30) Foreign Application Priority Data

Mar. 16, 2011 (GB) .................................. 1104378.3
Nov. 25, 2011 (GB) .................................. 1120365.0

(51) Int. Cl.
B64D 45/02   (2006.01)
(52) U.S. Cl.
CPC .................... B64D 45/02 (2013.01)
(58) Field of Classification Search
CPC ...................................................... B64D 45/02
(Continued)

(56) References Cited

U.S. PATENT DOCUMENTS 3,755,713 A * 8/1973 Paszkowski ................. 361/218
5,841,066 A * 11/1998 Bocherens ...................... 174/2
(Continued)

FOREIGN PATENT DOCUMENTS

EP   0074263 A2   3/1983
EP   0074263 A3   3/1983
(Continued)

OTHER PUBLICATIONS

Search Report for Application No. GB1104378.3, dated Mar. 14, 2012.
(Continued)

*Primary Examiner* — Stephen W Jackson
*Assistant Examiner* — Christopher Clark
(74) *Attorney, Agent, or Firm* — Hauptman Ham, LLP (57) ABSTRACT

An aircraft assembly comprising a plurality of structural components and an electrically conductive bonding network, wherein at least one of the structural components is formed of material of low electrical conductivity, and the bonding network includes either:
at least one substantially planar strip of highly electrically conductive material attached to at least the one structural component, and wherein the strip includes a substantially omega-shaped loop extending out of the plane of the strip; or
at least one strip of highly electrically conductive material attached to at least the one structural component, wherein the strip comprises first and second planar attachment portions for attaching the strip to the structural component(s) and an intermediate portion extending between the first and second attachment portions, and wherein the intermediate portion includes a loop which extends outwards from the plane of the first attachment portion.

24 Claims, 9 Drawing Sheets

(58) Field of Classification Search
USPC .......................................... 361/212, 216–218
See application file for complete search history.

(56) References Cited

U.S. PATENT DOCUMENTS

| | | | |
|---|---|---|---|
| 7,277,266 B1* | 10/2007 | Le et al. .................. | 361/218 |
| 7,864,501 B2* | 1/2011 | Rawlings et al. ............ | 361/216 |
| 8,922,970 B2* | 12/2014 | Hebert .................. | 361/217 |
| 2005/0213278 A1 | 9/2005 | Hawley | |
| 2006/0051592 A1* | 3/2006 | Rawlings et al. ......... | 428/423.1 |
| 2006/0146473 A1* | 7/2006 | Heidlebaugh et al. ....... | 361/220 |
| 2007/0217116 A1* | 9/2007 | Murcianos et al. .......... | 361/220 |
| 2007/0230085 A1* | 10/2007 | Le .......................... | B64D 45/02 |
| | | | 361/212 |
| 2008/0144249 A1* | 6/2008 | Rawlings .................. | 361/117 |
| 2010/0134945 A1* | 6/2010 | Rawlings et al. ............ | 361/218 |
| 2012/0063050 A1 | 3/2012 | Langone et al. | |

FOREIGN PATENT DOCUMENTS

| | | |
|---|---|---|
| EP | 0207825 A1 | 1/1987 |
| EP | 0221202 A1 | 5/1987 |
| EP | 1944236 A2 | 7/2008 |
| FR | 2679074 A1 * | 1/1993 |
| WO | 2009153452 A2 | 12/2009 |
| WO | 2010135318 A2 | 11/2010 |
| WO | 2010135318 A3 | 11/2010 |

OTHER PUBLICATIONS

Search Report for Application No. GB1104378.3, dated Jul. 15, 2011.
International Search Report and Written Opinion corresponding to PCT/GB2012/050534, dated Jul. 16, 2012.

* cited by examiner

AIRCRAFT BONDING NETWORK

RELATED APPLICATIONS

The present application is a National. Phase of International Application Number PCT/GB2012/050534, filed Mar. 9, 2012, and claims priority from British Application Number 1104378.3, filed Mar. 16, 2011, and from British Application Number 1120365.0, filed Nov. 25, 2011.

FIELD OF THE INVENTION

The present invention relates to an aircraft assembly including a bonding network for protection against lightning strike and static discharge.

BACKGROUND OF THE INVENTION

Traditional aircraft structural materials are predominantly metallic and so the dissipation of lightning strikes and static discharge induced by, for example, electrical cables is relatively straight-forward, as currents are able to freely flow through the metallic structure.

The hybrid of metallic and composite materials in aircraft currently under development brings about particular challenges, as the polymers used in high performance composites generally have low electrical conductivity. Electrical current flows within these hybrid structures therefore need to be managed and controlled so as to avoid the creation of "hot spots" and localised impact damage.

SUMMARY OF THE INVENTION

A first aspect of the invention provides an aircraft assembly comprising a plurality of structural components and an electrically conductive bonding network, wherein at least one of the structural components is formed of material of low electrical conductivity, and the bonding network includes at least one substantially planar strip of highly electrically conductive material attached to at least the one structural component, and wherein the strip includes a substantially omega-shaped loop extending out of the plane of the strip.

A second aspect of the invention provides an aircraft assembly comprising a plurality of structural components and an electrically conductive bonding network, wherein at least one of the structural components is formed of material of low electrical conductivity, and the bonding network includes at least one strip of highly electrically conductive material attached to at least the one structural component, wherein the strip comprises first and second planar attachment portions for attaching the strip to the structural component(s) and an intermediate portion extending between the two attachment portions, and wherein the intermediate portion includes a loop which extends outwards from the plane of the first attachment portion.

The invention is advantageous in that the out of plane loop can accommodate positional tolerances and thermal effects.

In the assembly according to the first aspect the omega-shaped loop may be formed adjacent one or both ends of the strip.

In the assembly according to the second aspect the loop may extend the entire width between the attachment portions.

The assembly may further comprise one or more clamps for attaching the strip(s) of the bonding network to the structural component(s). Each clamp may include a spacer element to hold the strip spaced from the structural component(s).

Alternatively, the assembly may further comprise a positioning feature attached to one of the structural components, and the strip may comprise a feature which is adapted to engage with the positioning feature. The positioning feature may include a spacer element to hold the strip spaced from the structural component(s), and the spacer element may be an insulator to protect an non metallic structural component from or a conductor to connect a metallic structural component to the bonding network. The positioning feature may comprise a stud bonded or otherwise mounted on the structural component(s).

The bonding network is preferably adapted to protect the structural component(s) against damage due to electrical loads, e.g. from lightning strike and static discharge.

The bonding network may include a plurality of the strips disposed adjacent one another so as to provide redundant paths within the network.

The structural component material of low electrical conductivity may include composite or thermoplastics material. The composite material may be fibre reinforced plastics material, such as carbon fibre reinforced plastic (CFRP), glass fibre reinforced plastic (GFRP), Kevlar, or other composite materials. The thermoplastics materials may include PEEK, PEK, ABS, or other thermoplastics materials.

The or each strip may be formed of metallic material. Examples of suitable metallic materials include copper, aluminium, etc.

The strip may include one or more fastener holes for fastening the strip to the structural component(s). The fastener hole may be adapted to receive a structural fastener used to fasten two or more of the structural components together.

The strip may be integrally formed with one or more plate-like elements for electrically connecting the bonding network to aircraft systems.

One or more of the strips may extend and electrically connect between metallic structural components. Examples of such structural components include wing ribs, fuselage frames, etc.

The structural components preferably include a wing box structure. In this case, the one structural component to which the bonding network is attached may be a wing spar. The spar may form part of a fuel tank boundary and the or each strip of the bonding network may be disposed on the side of the spar opposite the fuel tank. The structural components may include a plurality of metallic ribs, and one or more of the strips extend and electrically connect between adjacent metallic ribs. The bonding network may be used to electrically connect between a wing tip and a fuselage of the aircraft.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
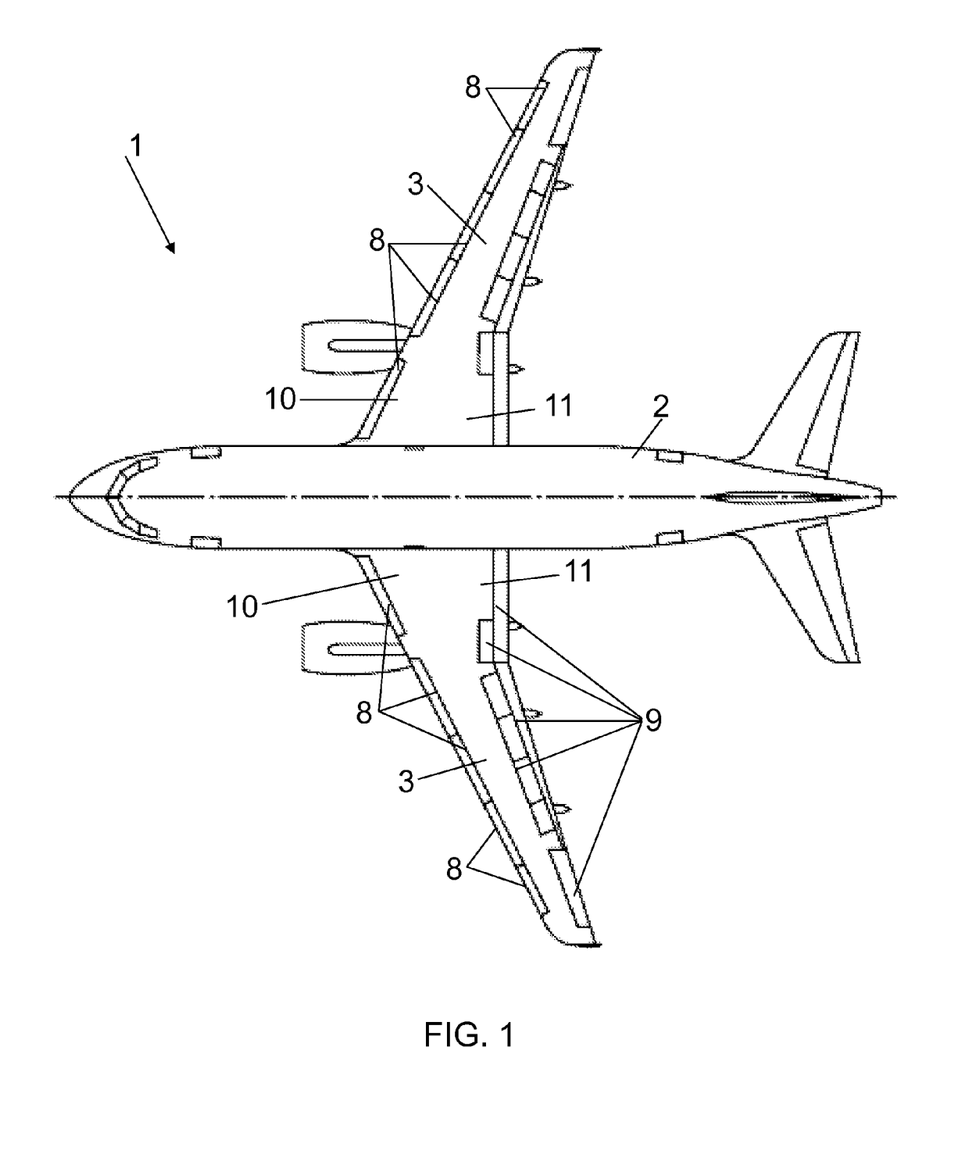
FIG. 1 illustrates a plan view of an aircraft having wings with leading and trailing edge structures.
Figure 2:
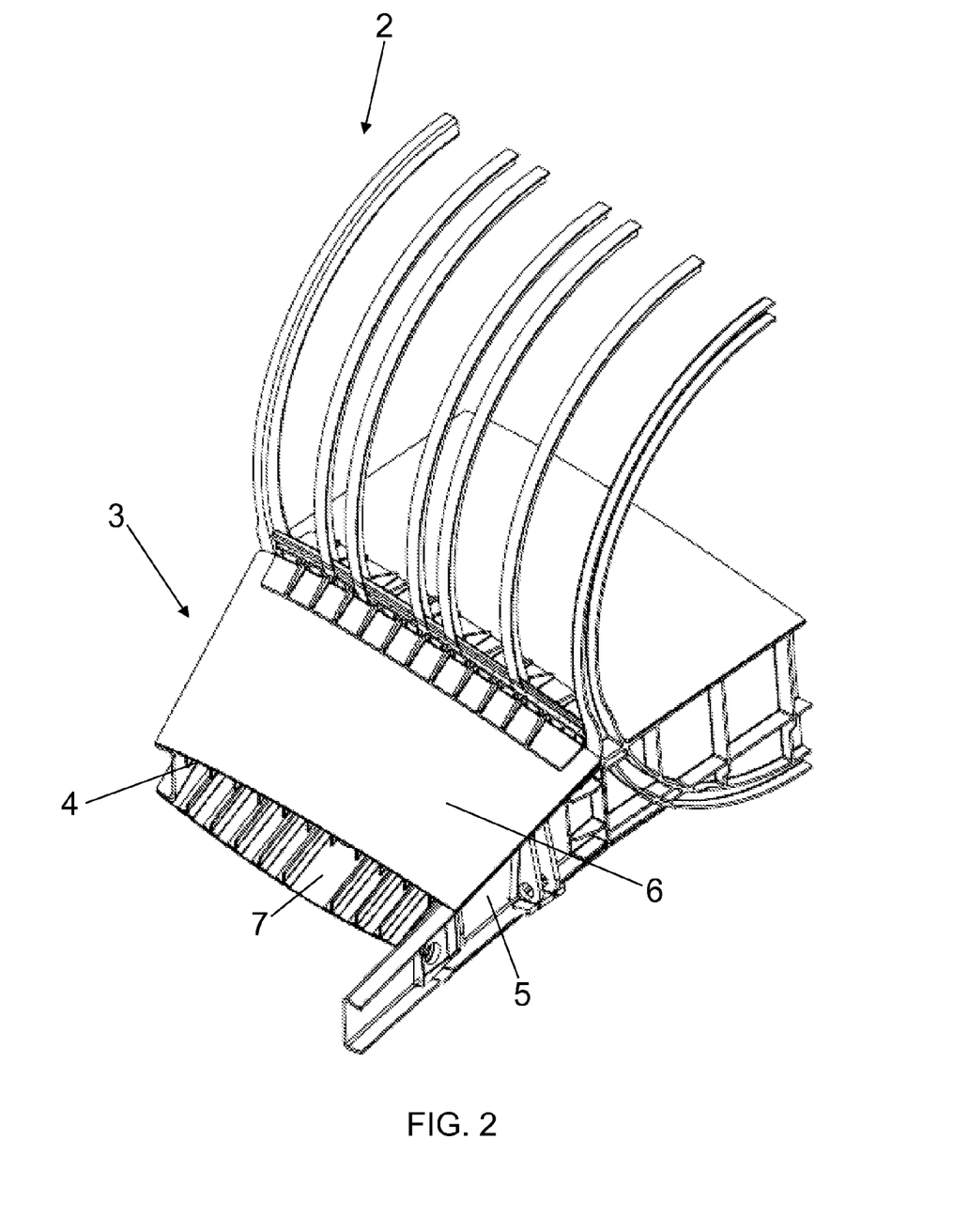
FIG. 2 illustrates a partially cut away view of the aircraft wing box structure at the fuselage intersection.

FIG. 1 illustrates a plan view of an aircraft 1 having a fuselage 2 with wings 3. As best shown in FIG. 2, each wing 3 includes a wingbox structure comprising a front spar 4, a rear spar 5 and upper and lower wing covers 6, 7 extending between the front and rear spars 4, 5. The wingbox structure further comprises a plurality of chordwise extending ribs (not shown in FIG. 2) spaced spanwise and attached to the front and rear spars 4, 5 and the upper and lower wing covers 6, 7. The interior volume of the wingbox may be used as a fuel tank in a conventional manner.

As best shown in FIG. 1, the wings 3 include leading edge flight control surfaces 8, such as slats or flaps for example, and trailing edge flight control surfaces 9, such as flaps, spoilers, ailerons and airbrakes for example.

A wing fixed leading edge structure generally indicated by reference numeral 10 is attached to the front spar 4. The various leading edge flight control surfaces 8 are movable with respect to the fixed leading edge structure 10. A fixed wing trailing edge structure is generally indicated by reference numeral 11 and is attached to the rear spar 5. The various trailing edge flight control surfaces 9 are movable with respect to the fixed trailing edge structure 11.

The fixed leading edge structure 10 includes a plurality of "D nose" panels, the outer surface of which form part of the aerodynamic wing surface, and which together with the front spar 4 define an interior space that houses various aircraft systems and system runs such as hydraulic and electrical cabling for example. The fixed trailing edge structure 11 includes upper and lower cover panels, the outer surface of which form part of the aerodynamic wing surface, and which together with the rear spar 5 define a space that houses further aircraft systems and system runs such as hydraulic and electrical cabling for example.

Whereas traditional aircraft have employed metallic materials for the aircraft primary structures such as the front and rear spars 4, 5 and the upper and lower wing covers 6, 7, aircraft currently under development make extensive use of lightweight composite materials for these primary structural components. Specifically, the front and rear spars 4, 5 in an embodiment of this invention are formed of carbon fibre reinforced plastics material, although it will be appreciated that a variety of alternative composite or thermoplastic materials may similarly be used for the front and rear spars 4, 5.

To protect against lightning strike and static discharge the largely composite aircraft wingbox includes a bonding network for managing and controlling electrical currents through the wingbox structure so as to aid in dispersing these high induced currents to freely run through the wing structure without causing "hot spots" and localised impact damage.

Figure 3:
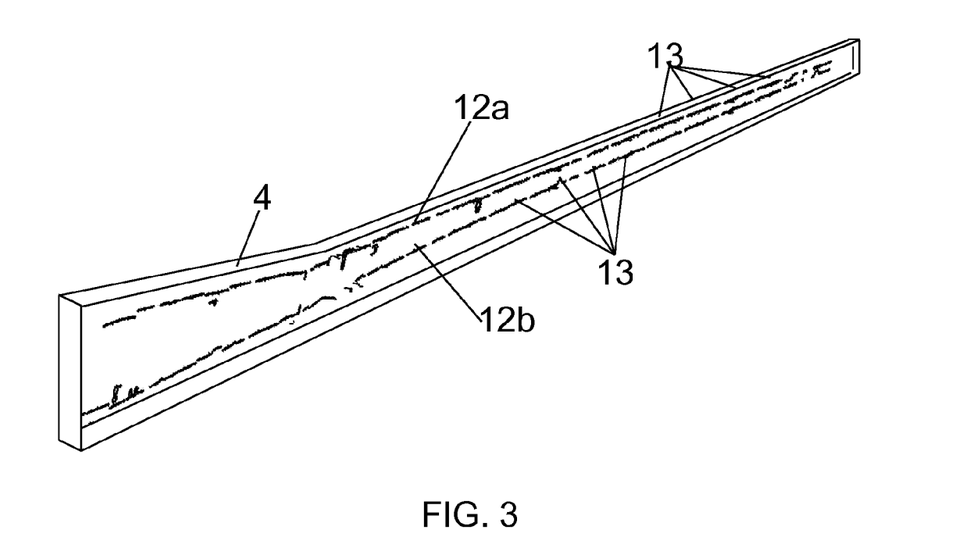
FIG. 3 illustrates schematically a composite wing spar having a plurality of metallic strips arranged in two discrete paths on the spar web, which make up part of a bonding network for managing electrical current flows.

FIG. 3 illustrates schematically the composite front spar 4 together with part of the bonding network. For each wing spar 4, 5 the bonding network includes two discrete paths 12a, 12b along the length of the spar 4. The part of the bonding network attached to the front spar 4 will be described in detail in the following but the part of the bonding network attached to the rear spar 5 is arranged similarly.

The two discrete paths 12a, 12b of the bonding network shown in FIG. 3 provide redundancy in the event of any damage occurring to either of the paths during service. Accordingly, the two paths 12a, 12b are arranged one above the other (so as to define upper and lower pathways) and are attached to the outer datum face of the front spar 4, i.e. on the opposite side to the fuel tank.

Figure 4:
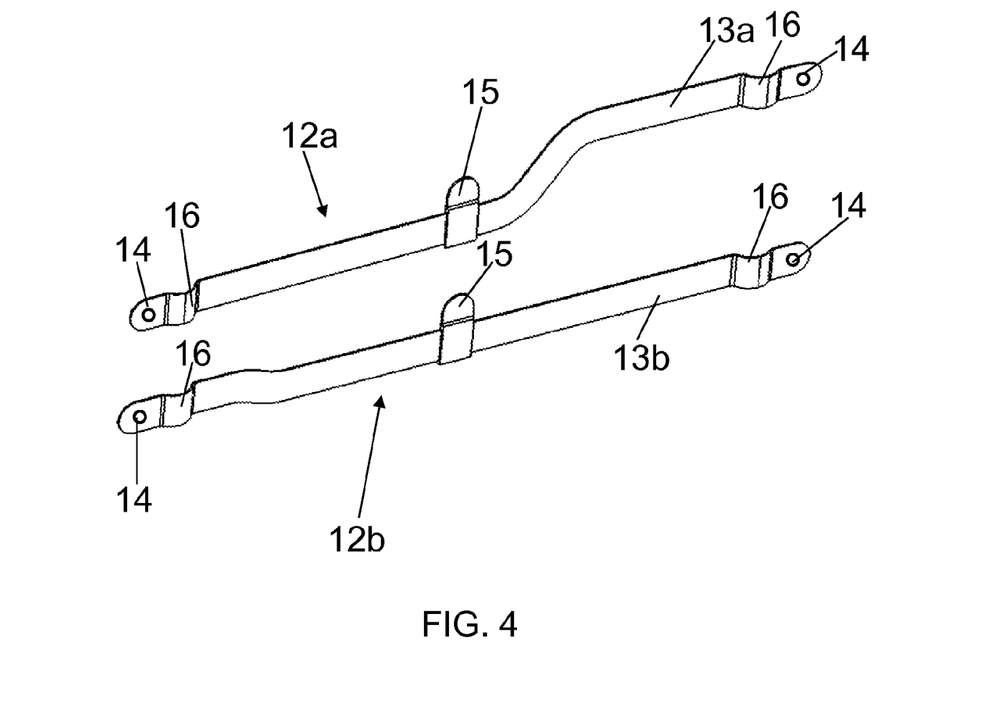
FIG. 4 illustrates two exemplary strips of the bonding network in detail.

Each of the paths 12a, 12b include a plurality of substantially planar strips 13 of highly electrically conductive material. FIG. 4 illustrates an upper strip 13a which forms part of the upper path 12a of the bonding network and a lower strip 13b which forms part of the lower path 12b of the bonding network. The paths 12a, 12b each extend along substantially the entire length of the front spar 4 from adjacent the fuselage 2 to the wingtip.

As mentioned previously, the wingbox includes a plurality of chordwise extending mid-box (fuel tank) ribs between the front and rear spars 4, 5, which are spaced spanwise across the wing. In one embodiment, these ribs (not shown) are formed of metallic materials such as aluminium or titanium for example. Each of these metallic ribs is connected to both the upper path 12a and the lower path 12b of the bonding network. Similarly, each of the ribs is connected to the paths of the bonding network along the rear spar 5.

The ribs define a plurality of bays within the wing box structure bounded by adjacent ribs and the front and rear spars 4, 5. Each of the strips 13 which make up the paths of the bonding network generally span across a single bay. In other words, for each path of the bonding network a single strip 13 extends between adjacent ones of the metallic ribs. An exception to this general rule is where aircraft systems connected to the bonding network necessitate multiple bonding strips across a single bay.

Each strip 13 has a typical cross section configured to protect against the voltage/current flow which can be expected to run through it and is dependent on the particular current flow requirements for a given wing. The typical cross section for any individual strip 13 is generally constant along the length of the strip.

The strips 13a, 13b shown in FIG. 4 will now be described in detail. Each of the strips 13 is generally planar along a substantial portion of its length. A fastener hole 14 is provided at each end of the strip 13 for attachment to the wing box ribs.

Advantageously, the ribs are fastened to the front and rear spars 4, 5 using structural fasteners and the fastener holes 14 in the strips 13 make use of the same structural fasteners so as to fasten the strips 13 to the spars 4, 5. Intermediate the ends of each strip 13 there is provided at least one clamp 15 for attaching the strip 13 to the spar 4 datum face. Each clamp 15 includes a spacer element for holding the strip 13 spaced from the spar datum face. The clamps 15 are adapted to reduce friction which may otherwise build up due to differential thermal expansion/contraction effects.

Adjacent each end of the strip 13 there is provided a substantially omega-shaped loop 16 that extends out of the plane of the strip. This loop 16, or kink, is particularly advantageous as it provides sufficient flexibility for the strip to accommodate changes in the length of the strip due, for example, to thermal expansion and also accommodates positional tolerances for attaching the strip 13 by means of its fastener receiving holes 14 at either end.

In another embodiment, the omega-shaped loop 16 may be located at another position along the length of the strip 13, and may not be adjacent an end of the strip.

It will be appreciated by those skilled in the art that the co-efficient of thermal expansion of the metallic strip 13 will differ from that of the composite material used in the front and rear spars 4, 5. Therefore, across the wide range of temperatures typically experienced by the aircraft during service the loops 16 provide sufficient flexibility for the strip to accommodate the typically greater thermal expansion of the strip 13 as compared with the composite material used for the front and rear spars 4, 5.

The flexibility in the strips 13 provided by the omega-shaped loops 16 beneficially accommodates positional tolerances between the structural fasteners used to fasten the ribs to the front and rear spars 4, 5. This avoids any need to slot the fastener receiving holes 14, which improves the electrical connection between the ribs and the bonding network. The fastener holes 14 can therefore be pre-drilled prior to assembly with confidence that assembly of the wing box with the bonding network can be accomplished without difficulty. This saves time and therefore cost in the assembly process.

Figures 5A, 5C:
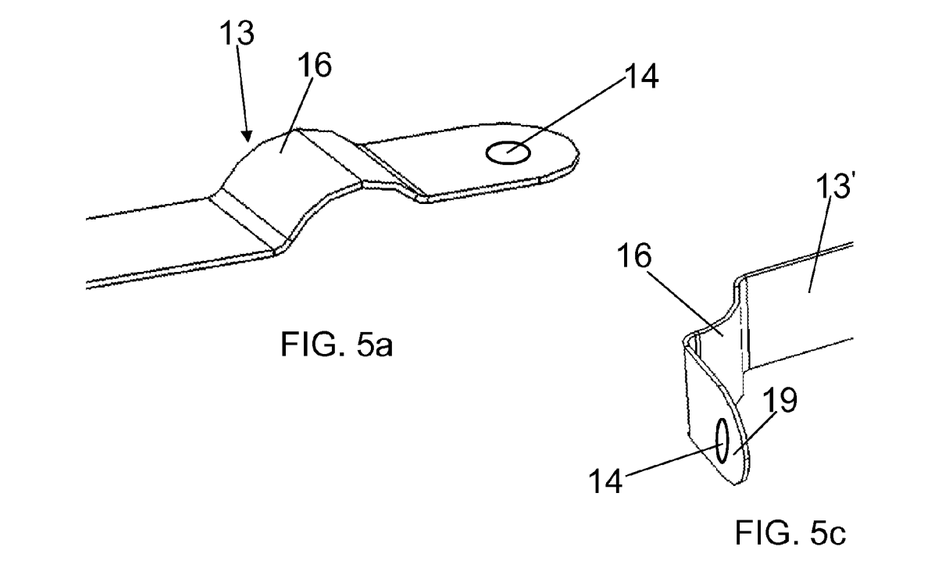
FIG. 5a illustrates the end of one of the bonding strips in detail.
FIG. 5c illustrates an alternative configuration for the end of the strip for fastening to the rib web.
Figure 5B:
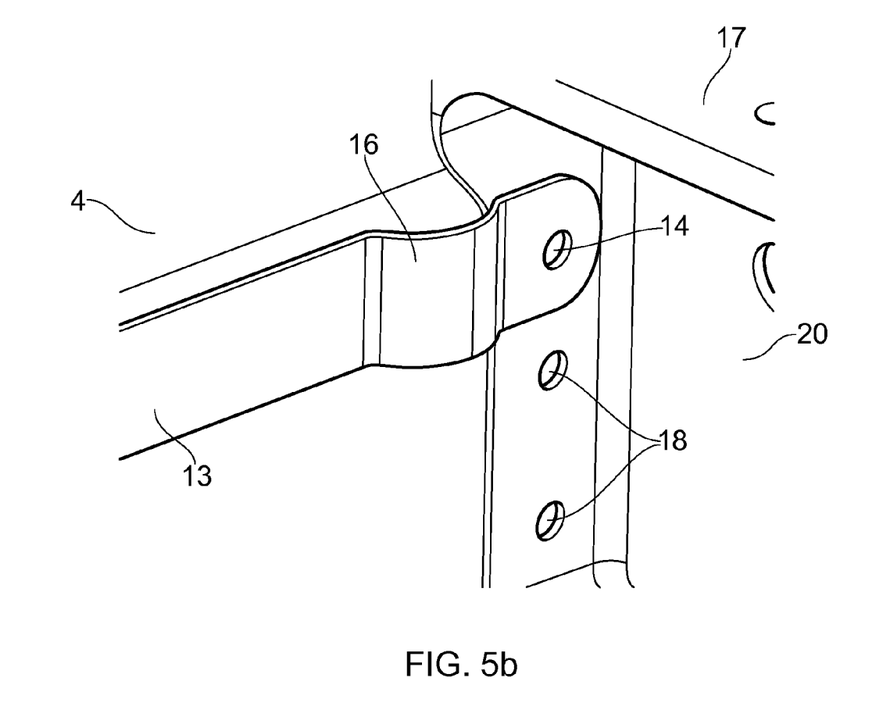
FIG. 5b illustrates the strip mounted on the front spar web and connected to a metallic leading edge rib flange by a structural fastener.

FIG. 5a illustrates one end of the strip 13 in detail showing the loop 16 extending out of the plane of the strip. FIG. 5b illustrates the end of the strip 13 shown in FIG. 5a installed spaced from the front spar 4 datum surface and attached at one end to a metallic leading edge rib 17. The structural fasteners used to fasten the rib 17 to the spar 4 and also for attachment of the strip 13 have been removed from FIG. 5b for clarity. However, the structural fastener holes 18 formed in the rib 17 and the hole 14 in the strip 13 are visible.

FIG. 5c shows an alternative design for the end of the strip. The strip 13' has one end 19 formed approximately at right angles to the plane of the strip with the loop 16 extending between the end 19 and the plane of the strip. The fastener hole 14 is provided in the end 19 of the strip as before. This alternative design may be used for attaching the end of the strip 13' to a web 20 of the rib 17 in the event that the structural fasteners used for fastening the rib 17 to the spar 4 cannot be shared for also attaching the strip 13'.

The connections between the strips 13 of the bonding network and the leading edge ribs 17 that form part of the fixed wing leading edge structure 10 are relatively straightforward since both the bonding network and the leading edge ribs are on the same side of the front spar 4, i.e. opposite the fuel tank. However, it is also sometimes required to connect the bonding network to components on the other side of the spar.

Figure 6:
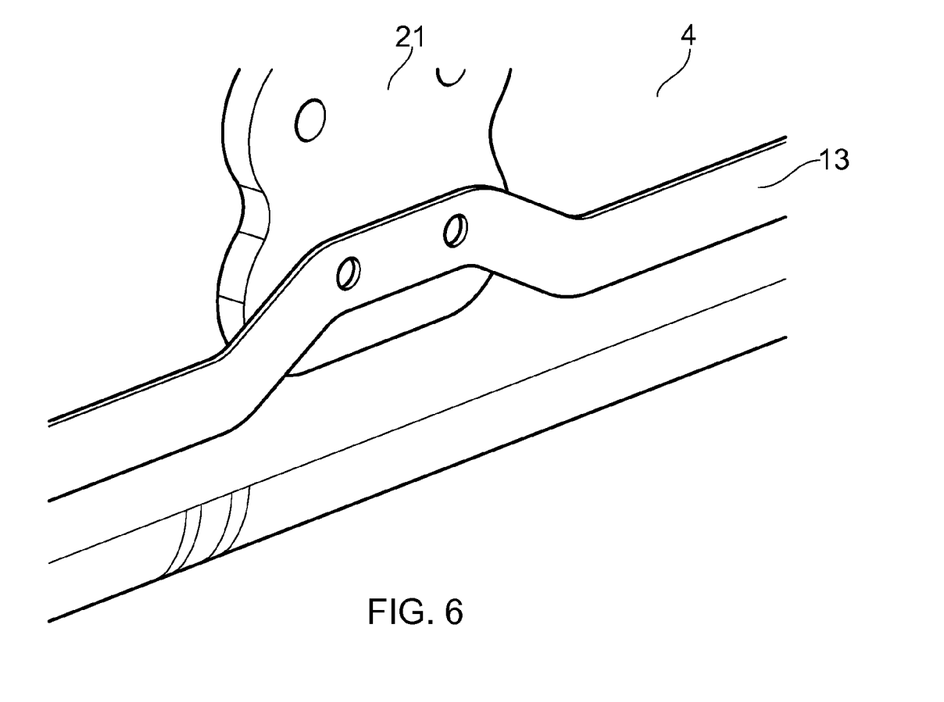
FIG. 6 illustrates another of the bonding strips mounted on the spar web and connected to a metallic wing box rib by a structural fastener through the spar.

FIG. 6 illustrates a typical connection between the bonding network and a mid box fuel tank rib, which extends between the front and rear spars 4, 5. As shown in FIG. 6, the strip 13 of the bonding network is disposed in front of the front spar 4 and a rib spar post 21 for connecting a metallic mid box rib (not shown) to the front spar 4 is disposed on a rear surface of the front spar, opposite the bonding network. As shown in FIG. 6, the strip 13 includes an in-plane kink to align the path of the bonding network with the structural fasteners used for fastening the rib spar post 21 to the front spar 4.

Figure 7:
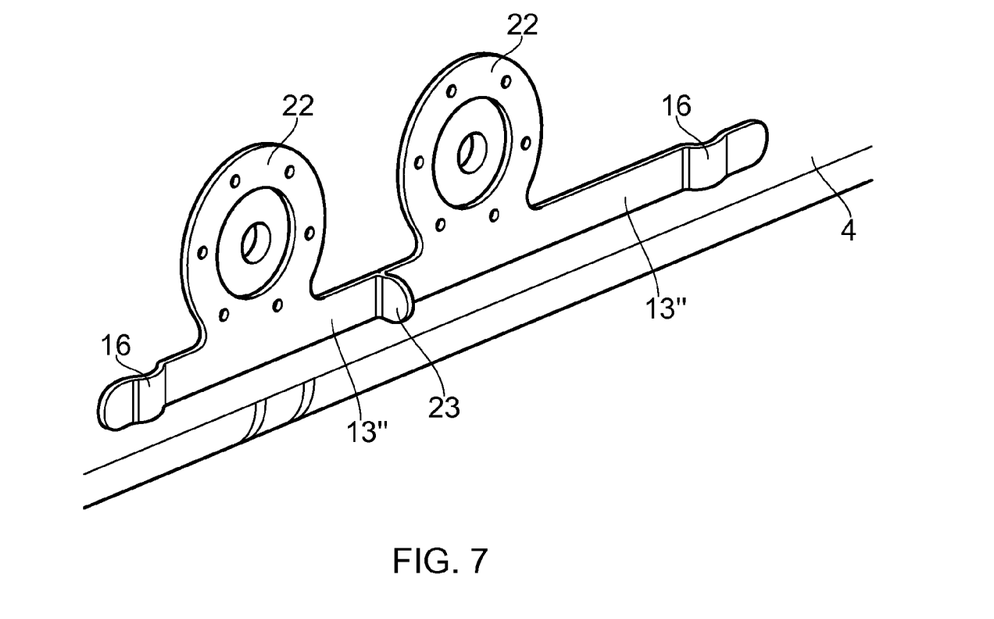
FIG. 7 illustrates another of the bonding strips mounted on the spar web, in which the strips are integrally formed with a "splat plate" for electrically connecting the bonding strips to aircraft systems.

As mentioned previously, the bonding network is used to connect not only to the metallic ribs but also to the various electrical, hydraulic and flight instrumentation systems which run along the wing leading and trailing edges. FIG. 7 illustrates a typical connection between the bonding network and these hydraulic, fuel and general aircraft systems. As shown, the strip 13" of the bonding network is integrally formed with a plate-like hoop 22 element, a so-called "splat plate". The strip 13" incorporates the out of plane omega-shaped loop 16 at one end, and a pair of the strips 13" are joined end to end by abutting connection surfaces 23 set substantially perpendicular to the plane of the strip 13.

Figure 8:
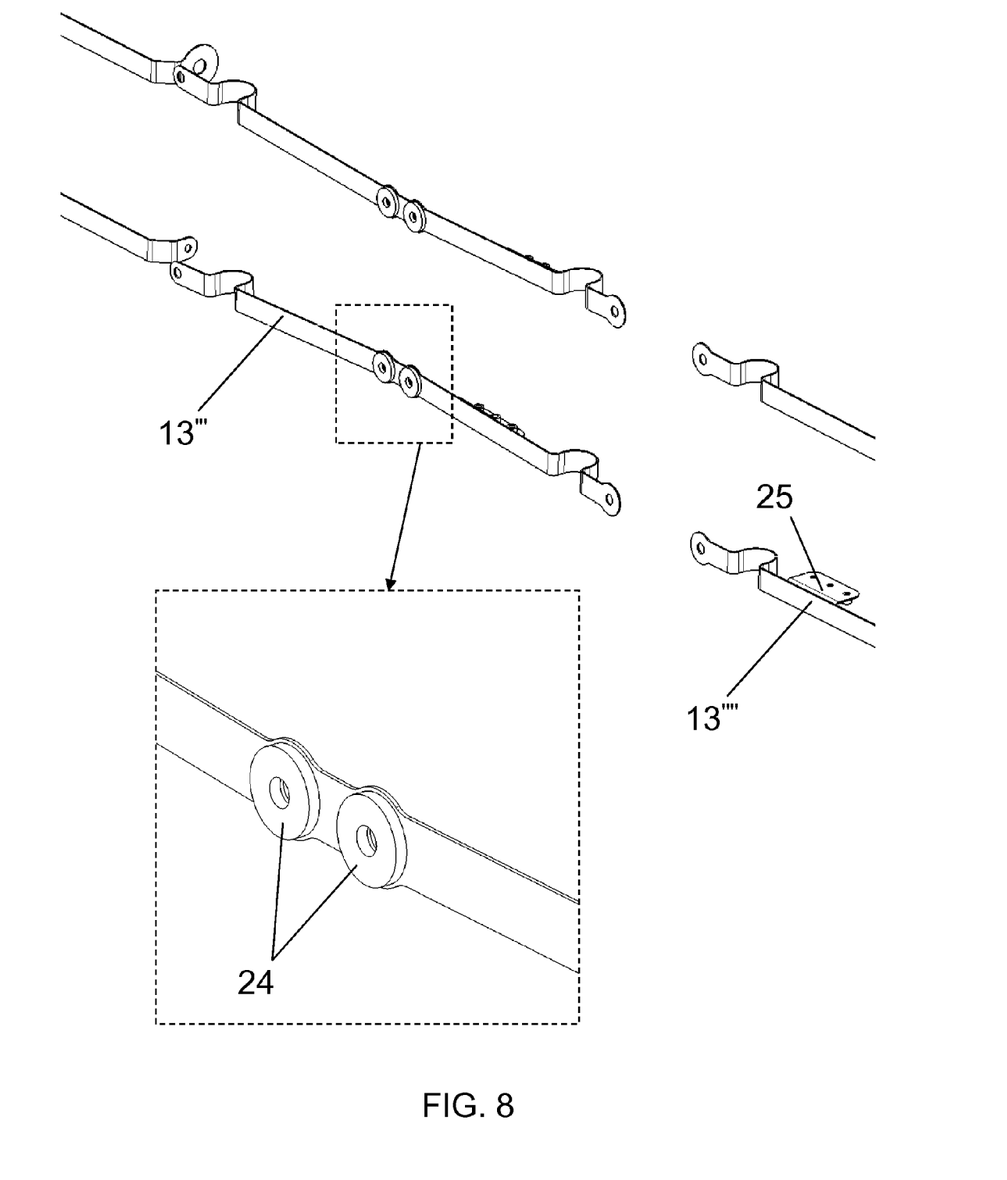
FIG. 8 illustrates another part of the bonding network, in which the strips include conductive washers and equipment mounting brackets.

FIG. 8 illustrates another part of the bonding network in which an exemplary one of the strips 13''' includes washers 24 at rib locations to hold the bonding network spaced from the spar datum surface. The thickness of each washer 24 is selected so as to maintain a substantially constant offset between the bonding network and the spar datum surface. The washer 24 is made of the same conductive material as the strip 13''' to ensure continuity of electrical conductivity. The washers 24 prevent deformation of the strip 13''' during tightening of the structural fasteners, which are used to attach the ribs to the spars, and are also used to attach the bonding network. Holding the bonding network spaced from the spar datum surface protects against water ingress and general environmental debris from building up between the spar and the bonding network. The strip 13'''' includes a mounting bracket 25 for attaching instrumentation, such as flight test equipment, for example, to the bonding network.

Figure 9A:
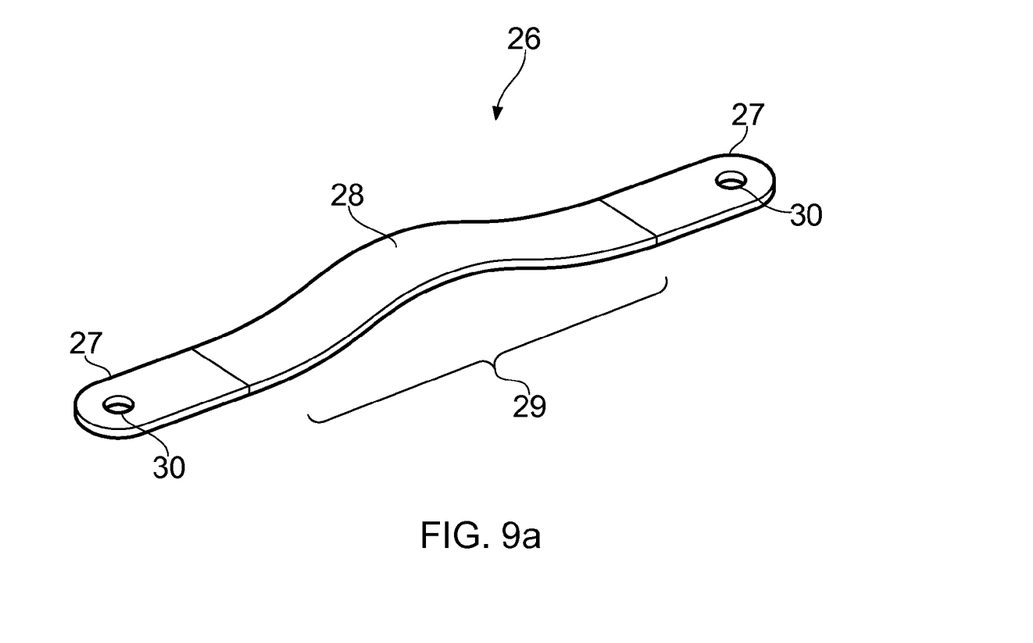
FIG. 9a illustrates another of the bonding strips having two planar attachment portions and a loop extending between the attachment portions.

FIG. 9a illustrates an alternative example of a bonding strip 26 which may form part of the electrically conductive bonding network in the aircraft wing structure described above. The strip 26 has two planar attachment portions 27, one at either end of the strip, and an intermediate portion 29 between the attachment portions, where a loop 28 is formed in the intermediate portion. The loop extends out from the plane of the attachment portions 27 and provides the strip 26 with increased flexibility. A fastener hole 30 extends through each of the attachment portions to allow the strip 26 to be attached to at least one structural component.

Figure 9B:
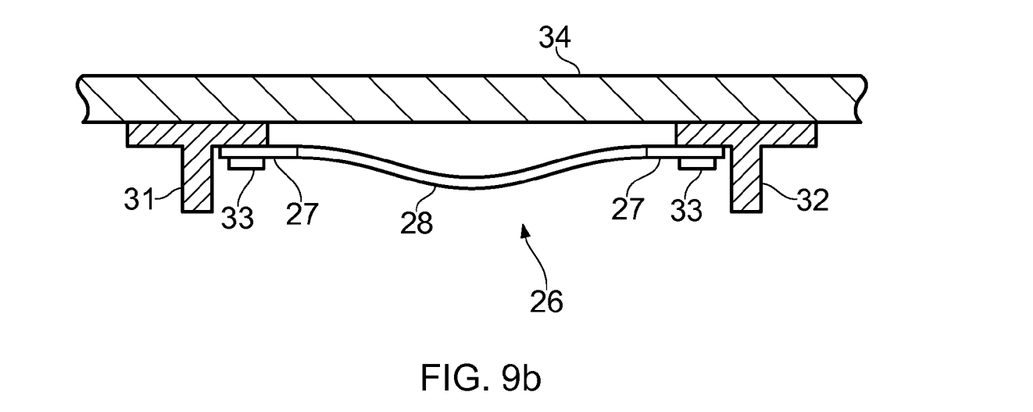
FIG. 9b illustrates the bonding strip of FIG. 9a electrically connecting two structural components.

FIG. 9b illustrates a side section view of the strip 26 of FIG. 9a attached to two metallic structural components 31, 32 using fasteners 33 which pass through the attachment portions 27. The metallic structural components 31, 32 are attached to a non-metallic structural component 34. In the embodiment shown the metallic structural components 31, 32 are ribs and the non-metallic structural component 34 is a composite spar of the aircraft wing box structure. However, in an alternative embodiment, the metallic structural components 31, 32 may equally be control surface attachment structures or other components in a wing structure or in another part of an aircraft, and the non-metallic structural component 34 may equally be a composite wing cover or another component in a wing structure or in another part of an aircraft.

The bonding strip 26 electrically connects the ribs 31, 32, so that the strip 26 and the ribs 31, 32 form part of an electrically conductive bonding network which is adapted to protect the composite structural component(s) against damage due to electrical loads, e.g. from lightning strike and static discharge.

The flexibility provided by the loop 28 beneficially accommodates positional tolerances for the fasteners used to attach the strip 26 to the ribs 31, 32 and allows for a difference in thermal expansion coefficient between the strip 26 and the spar 34.

Figure 10A:
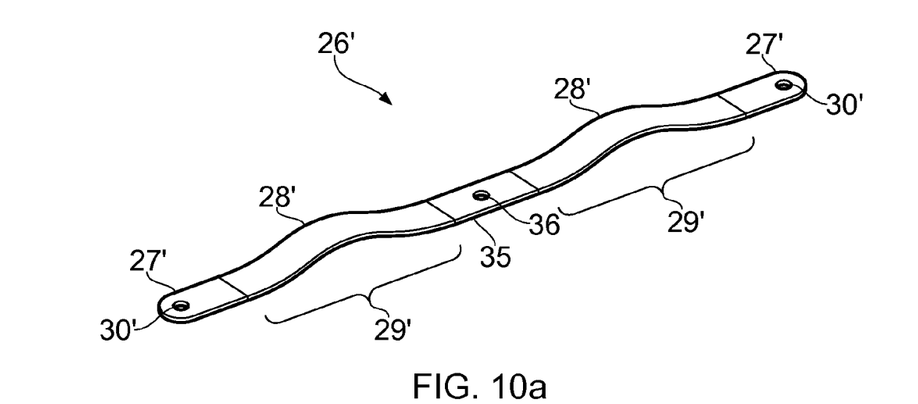
FIG. 10a illustrates another of the bonding strips which is designed to engage with a positioning feature.

FIG. 10*a* illustrates a yet further example of a bonding strip 26' which may be used in the electrically conductive bonding network. The strip 26' has two planar attachment portions 27', one at either end of the strip, and an intermediate portion extending between the two attachment portions which includes a positioning portion 35 (which in this example is located substantially centrally) that is adapted to engage with a positioning feature, and two loops 28', one on either side of the positioning portion 35. The loops 28' extend out from the plane of the attachment portions 27', and provide the strip 26' with increased flexibility. A fastener receiving hole 30' extends through each of the attachment portions 27' to enable the strip 26' to be attached to at least one structural component.

Figure 10B:
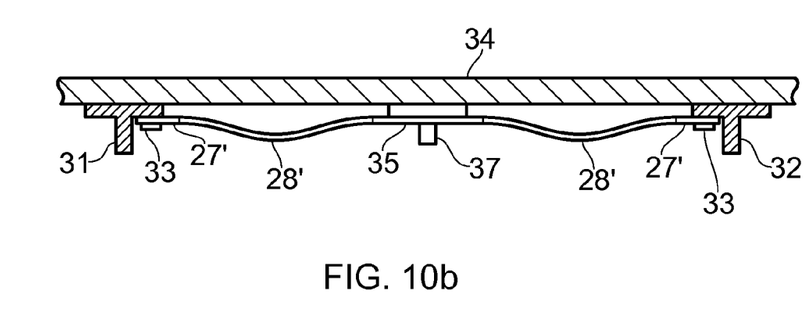
FIG. 10b illustrates the bonding strip of FIG. 10a electrically connecting two structural components.

As shown in FIG. 10*b*, the strip 26' may be arranged in a similar manner to the strip 26 of FIGS. 9*a* and 9*b*, and attached to similar structural components providing similar functionality. Additionally, strip 26' is supported between the attachment portions by receiving a positioning feature, formed as a stud 37, into a hole 36 formed in the positioning portion 35 of the strip 26'. The stud 37 is bonded, or otherwise, mounted on the spar 34 and assists with location of the strip 26'. The stud 37 includes a spacer element which holds the strip 26' spaced apart from the spar 34.

Holding the bonding network spaced from the spar datum surface protects against water ingress and general environmental debris from building up between the spar and the bonding network. By providing the stud with a spacer formed of an insulating material, the positioning feature also helps to electrically isolate the spar from the bonding network.

It is to be noted that the positioning studs 37 may be used to replace the clamps 15 shown in FIG. 4 or to replace the washers 24 shown in FIG. 8 in combination with any of the bonding strips 13, 13', 13" or 13''' described previously. Similarly, the clamps 15 or the washers 24 may be used to replace the studs 37 in combination with the bonding strip 26' described above.

Figure 11A:
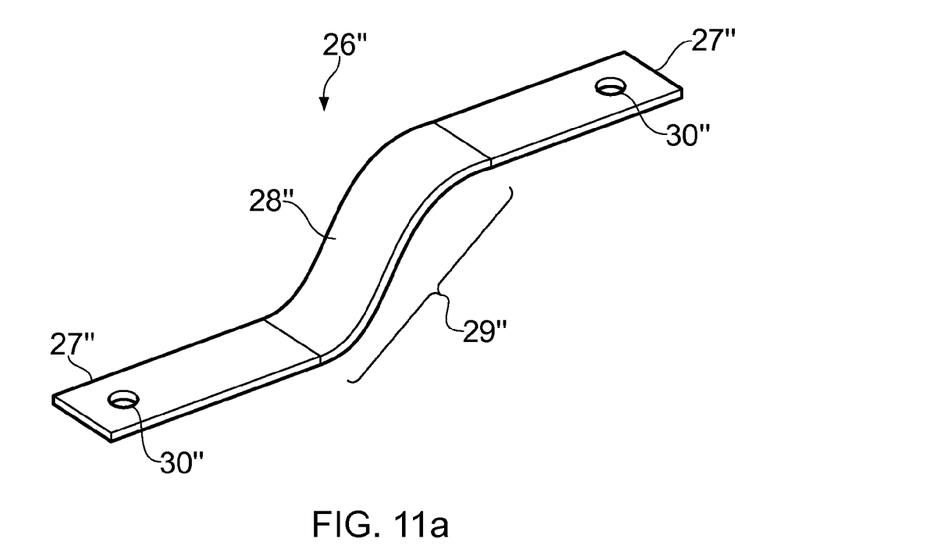
FIG. 11a illustrates another of the bonding strips having two planar attachment portions and a generally S-shaped loop extending between the attachment portions.

FIG. 11*a* illustrates a yet further example of a bonding strip 26" which may be used in the electrically conductive bonding network. The bonding strip 26" has two planar attachment portions 27", one at either end of the strip, and an intermediate portion formed as an inflected loop 28" extending between the attachment portions. In this embodiment the attachment portions 27" are not in the same plane so that the bonding strip can electrically connect two components which do not have faces in a common plane.

Figure 11B:
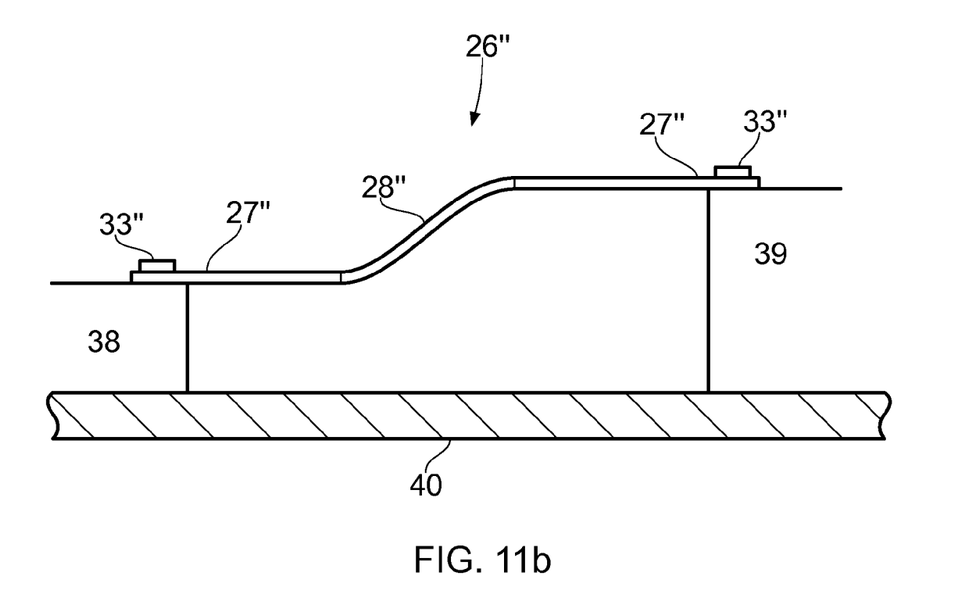
FIG. 11b illustrates the bonding strip of FIG. 10a electrically connecting two structural components.

As shown in FIG. 11*b*, the strip 26" may be attached to the metallic structural components 38, 39 and secured using fasteners 33" which pass through the attachment portions 27". The strip 26" provides an electrical connection between two metallic components 38, 39 both of which are mounted on a non-metallic component 40. The loop 28" provides flexibility to accommodates positional tolerances for the fasteners 33" used to attach the strip 26" to the ribs structural components 38, 39, and allows for a difference in thermal expansion coefficient between the strip 26 and the non-metallic structural component 40.

It will be appreciated that the bonding strips described above are purely exemplary and that these and other alternative forms of the bonding strip are envisaged within the scope of the invention. The strips all share the common feature of the out of plane, loop to accommodate positional tolerances and thermal effects. In some embodiments the loop may be substantially omega-shaped and located adjacent at least one end of the strip. In other embodiments the loop may be flatter to define a simple curve intermediate the ends of the strip, and in other embodiments the loop may define an inflected S-shape.

Whilst in the embodiments described above, the invention has been described with respect to an aircraft wing it will be appreciated that the bonding network is not limited for use on the wing and may similarly be used on the aircraft fuselage, tail structure, etc.

Furthermore, in the embodiments described above redundant bonding paths are provided but it will be appreciated that the invention is not limited to a bonding network with redundant paths. Single pathways may be appropriate under some circumstances and the cross section of the bonding strips may be adjusted accordingly to accommodate the required current load.

Although the invention has been described above with reference to one or more preferred embodiments, it will be appreciated that various changes or modifications may be made without departing from the scope of the invention as defined in the appended claims.

The invention claimed is:

1. An aircraft assembly comprising a plurality of structural components and an electrically conductive bonding network, wherein at least one of the structural components is formed of material of low electrical conductivity, and the bonding network includes at least one substantially planar strip of highly electrically conductive material attached to at least the one structural component, wherein a portion of the strip is formed as a substantially omega-shaped loop extending outwardly in a direction away from a surface of the structural component, and wherein the strip has a first end and a second end opposite the first end and the strip is attached to the structural component by at least one fastener at the first end and by at least one fastener at the second end.

2. An assembly according to claim 1, wherein the loop is formed adjacent one or both ends of the strip.

3. An assembly according to claim 1 wherein the strip comprises first and second attachment portions for attaching the strip to the structural component(s) and an intermediate portion extending between the two attachment portions.

4. An aircraft assembly comprising a plurality of structural components and an electrically conductive bonding network, wherein at least one of the structural components is formed of material of low electrical conductivity, and the bonding network includes at least one strip of highly electrically conductive material attached to at least the one structural component, wherein the strip comprises first and second planar attachment portions for attaching the strip to the structural component(s) and an intermediate portion extending between the first and second attachment portions, and wherein the intermediate portion of the strip is formed as a loop which extends outwardly in a direction away from a surface of the structural component, and wherein the strip has a first end and a second end opposite the first end and the strip is attached to the structural component by at least one fastener at the first end and by at least one fastener at the second end.

5. An assembly according to claim 4 wherein the loop extends the entire width between the first attachment portion to the second attachment portion.

6. An assembly according to claim 3 further comprising a positioning feature attached to the structural component(s), and wherein the intermediate portion of the strip includes a feature which is adapted to engage with the positioning feature.

7. An assembly according to claim 6, wherein the positioning feature comprises a stud bonded to the structural component(s).

8. An assembly according to claim 6, wherein the positioning feature includes a spacer element to hold the strip spaced from the structural component(s).

9. An assembly according to claim 1, further comprising one or more clamps for attaching the strip(s) of the bonding network to the structural component(s).

10. An assembly according to claim 9, wherein each clamp includes a spacer element to hold the strip spaced from the structural component(s).

11. An assembly according to claim 1, wherein the bonding network is adapted to protect the structural component(s) against damage due to electrical loads, e.g. from lightning strike and static discharge.

12. An assembly according to claim 1, wherein the bonding network includes a plurality of the strips disposed adjacent one another so as to provide redundant paths within the network.

13. An assembly according to claim 1, wherein the structural component material of low electrical conductivity includes composite or thermoplastics material.

14. An assembly according to claim 1, wherein the or each strip is formed of metallic material.

15. An aircraft assembly comprising a plurality of structural components and an electrically conductive bonding network, wherein at least one of the structural components is formed of material of low electrical conductivity, and the bonding network includes at least one substantially planar strip of highly electrically conductive material attached to at least the one structural component, wherein the strip includes a substantially omega-shaped loop extending out of the plane of the strip, and-wherein the strip has a first end and a second end opposite the first end and the strip is attached to the structural component by at least one fastener at the first end and by at least one fastener at the second end.

16. An assembly according to claim 15, wherein the fasteners are used to fasten two or more of the structural components together.

17. An aircraft assembly comprising a plurality of structural components and an electrically conductive bonding network, wherein at least one of the structural components is formed of material of low electrical conductivity, and the bonding network includes at least one substantially planar strip of highly electrically conductive material attached to at least the one structural component, wherein the strip includes a substantially omega-shaped loop extending out of the plane of the strip, and the strip is integrally formed with one or more plate-like elements for electrically connecting the bonding network to aircraft systems, and wherein the strip has a first end and a second end opposite the first end and the strip is attached to the structural component by at least one fastener at the first end and by at least one fastener at the second end.

18. An assembly according to claim 1, wherein one or more of the strips extend and electrically connect between metallic structural components.

19. An assembly according to claim 1, wherein the structural components include a wing box structure.

20. An assembly according to claim 19, wherein the one structural component is a spar.

21. An assembly according to claim 20, wherein the spar forms part of a fuel tank boundary and each strip of the bonding network is disposed on the side of the spar opposite the fuel tank.

22. An assembly according to claim 19, wherein the structural components include a plurality of metallic ribs, and one or more of the strips extend and electrically connect between adjacent metallic ribs.

23. An assembly according to claim 19, wherein the bonding network electrically connects between a wing tip and a fuselage of the aircraft.

24. An aircraft assembly comprising a plurality of structural components and an electrically conductive bonding network, wherein at least one of the structural components is formed of material of low electrical conductivity, and the bonding network includes at least one strip having a substantially planar portion and non-planar portion of highly electrically conductive material attached to at least the one structural component, wherein the non-planar portion of the strip is formed as a substantially omega-shaped loop extending out of the plane of the strip, and wherein the strip has a first end and a second end opposite the first end and the strip is attached to the structural component by at least one fastener at the first end and by at least one fastener at the second end.

* * * * *